(12) United States Patent
Yashiki

(10) Patent No.: US 10,665,179 B2
(45) Date of Patent: May 26, 2020

(54) DISPLAY DEVICE

(71) Applicant: SHARP KABUSHIKI KAISHA, Sakai, Osaka (JP)

(72) Inventor: Masafumi Yashiki, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 12 days.

(21) Appl. No.: 16/257,640

(22) Filed: Jan. 25, 2019

(65) Prior Publication Data
US 2019/0237028 A1 Aug. 1, 2019

(30) Foreign Application Priority Data

Jan. 26, 2018 (JP) .................. 2018-011871

(51) Int. Cl.
| G09G 3/34 | (2006.01) |
| G09G 3/36 | (2006.01) |
| G02B 6/00 | (2006.01) |
| G02F 1/13 | (2006.01) |
| G09F 13/18 | (2006.01) |
| G09F 19/12 | (2006.01) |
| H04N 5/57 | (2006.01) |
| H04N 9/77 | (2006.01) |
| F21V 8/00 | (2006.01) |
| G02F 1/1362 | (2006.01) |

(52) U.S. Cl.
CPC ......... *G09G 3/3413* (2013.01); *G02B 6/0068* (2013.01); *G02B 6/0073* (2013.01); *G02F 1/136286* (2013.01); *G09G 3/3607* (2013.01); *G09G 2300/0452* (2013.01); *G09G 2310/08* (2013.01); *G09G 2320/0666* (2013.01)

(58) Field of Classification Search
CPC combination set(s) only.
See application file for complete search history.

(56) References Cited

U.S. PATENT DOCUMENTS

| 2009/0268132 A1* | 10/2009 | Takama | G02F 1/13338 349/106 |
| 2016/0057411 A1* | 2/2016 | Shinohara | H04N 13/356 345/419 |
| 2016/0178979 A1 | 6/2016 | Kita et al. | |
| 2017/0310956 A1* | 10/2017 | Perdices-Gonzalez | H04N 13/366 |
| 2019/0004595 A1* | 1/2019 | Mizuno | G09G 3/34 |
| 2019/0268072 A1* | 8/2019 | Aoyama | H04B 10/1141 |

FOREIGN PATENT DOCUMENTS

| JP | 2003-060944 A | 2/2003 |
| JP | 2003-122286 A | 4/2003 |
| JP | 2017-111313 A | 6/2017 |
| JP | 2017111313 A * | 6/2017 |
| WO | 2014/136586 A1 | 9/2014 |

* cited by examiner

*Primary Examiner* — Wesner Sajous
(74) *Attorney, Agent, or Firm* — ScienBiziP, P.C.

(57) ABSTRACT

A display device has a light unit including a light source, and a display panel, which the rear surface of the display panel has transmissive. The display device has a first display mode of turning ON the light source and displaying a color image in a display region of the display panel, and a second display mode of turning OFF the light source and displaying a transmitted light image including a transmissive region in the display region. The display device detects whether or not a observer of the display device exists around and switches into the second display mode upon detection of the observer.

7 Claims, 9 Drawing Sheets

DISPLAY DEVICE

TECHNICAL FIELD

The present invention relates to a display device.

BACKGROUND ART

There have conventionally been proposed techniques of adopting a transmissive display, which has pixel transmissivity controlled to cause a background to be seen through a display surface, for advertisement of goods disposed in a showcase, a vending machine, or the like (see Patent Literatures 1 to 3). Such a transmissive display includes a display panel that is disposed on a rear surface of a front panel of the showcase, the vending machine, or the like, and is configured to be switched between a transmissive state of causing the goods in the showcase, the vending machine, or the like to be seen through the display panel and an image display state of displaying a still picture or a moving picture to prevent the internal goods from being seen through.

CITATION LIST

Patent Literatures

Patent Literature 1: JP 2003-122286 A
Patent Literature 2: Re-publication of PCT International Publication No. 2014/136586
Patent Literature 3: JP 2017-111313 A

SUMMARY OF INVENTION

Technical Problem

Adoption of the transmissive display according to any one of Patent Literatures 1 to 3 as digital signage needs more effective switching between the transmissive state and the image display state for advertisement of the goods disposed in the showcase, the vending machine, or the like.

The following invention provides a technique for more effective switching between a transmissive state and an image display state in a transmissive display device configured to be switched between the transmissive state and the image display state.

Solution to Problem

According to an embodiment of the present invention, a display device includes: a display panel having a display region including a plurality of pixels; a lighting unit including a light source and configured to irradiate, with light emitted from the light source, a rear surface opposite to a display surface of the display panel; a detector configured to detect whether or not an observer of the display surface exists around; and a display controller configured to control transmissivity of the pixels in the display panel and the light source in accordance with image data to be displayed on the display panel and a result of detection by the detector; in which the rear surface of the display panel is transmissive, and the display controller has a first display mode of turning ON the light source and displaying a color image in the display region, and a second display mode of turning OFF the light source and displaying a transmitted light image causing a background of the display panel to be seen through in at least part of the display region, and is switched into the second display mode when the detector detects the observer.

Advantageous Effect of Invention

The present invention enables more effective switching between a transmissive state and an image display state in a transmissive display device configured to be switched between the transmissive state and the image display state.

DESCRIPTION OF EMBODIMENTS

Figure 1:
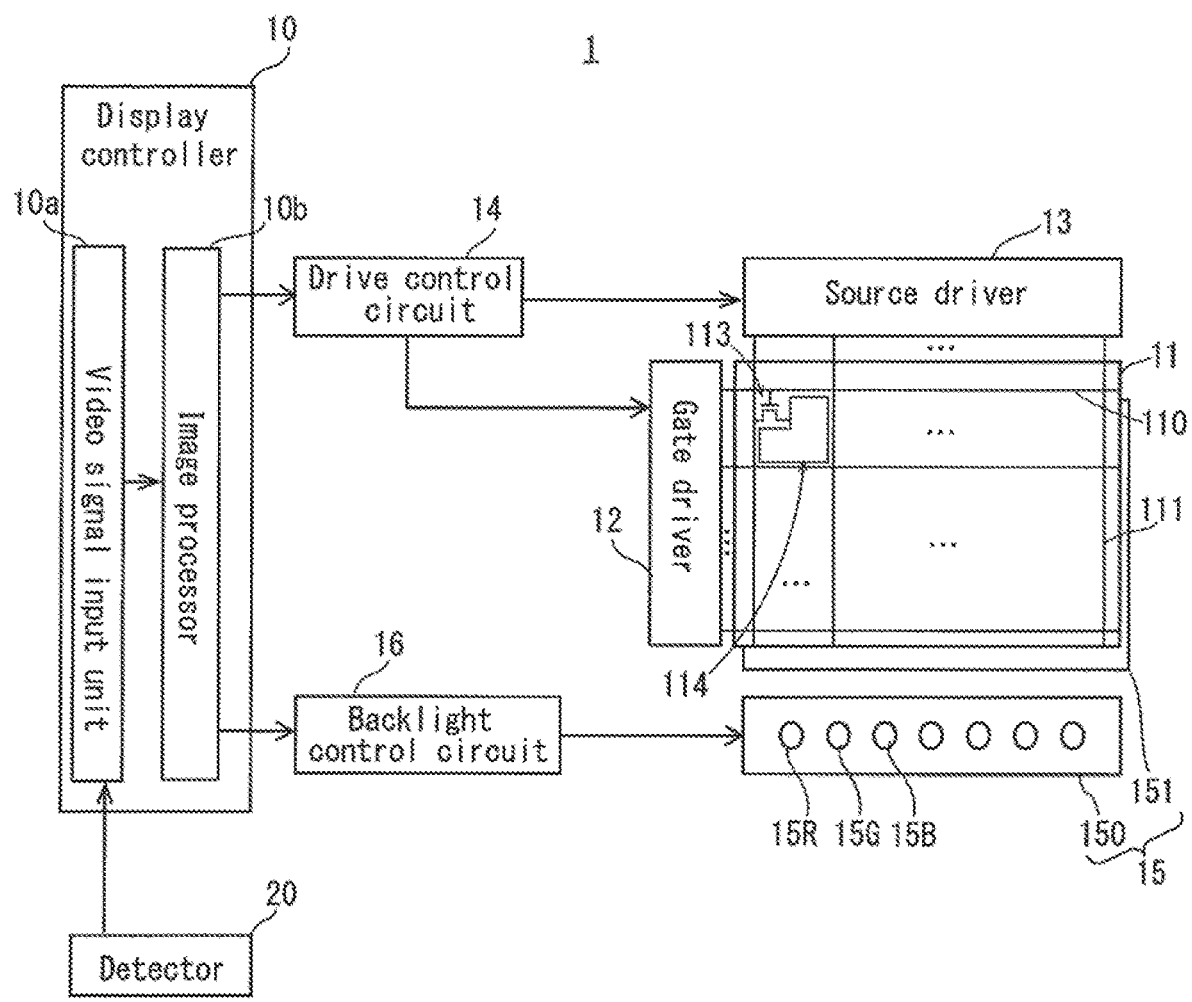
FIG. 1 is a pattern diagram illustrating a schematic configuration of a display device according to an embodiment.

According to an embodiment of the present invention, a display device includes: a display panel having a display region including a plurality of pixels; a lighting unit including a light source and configured to irradiate, with light emitted from the light source, a rear surface opposite to a display surface of the display panel; a detector configured to detect whether or not an observer of the display surface exists around; and a display controller configured to control transmissivity of the pixels in the display panel and the light source in accordance with image data to be displayed on the display panel and a result of detection by the detector; in which the rear surface of the display panel is transmissive, and the display controller has a first display mode of turning ON the light source and displaying a color Image in the display region, and a second display mode of turning OFF the light source and displaying a transmitted light image including a transmissive region causing a background of the display panel to be seen through in at least part of the display region, and is switched into the second display mode when the detector detects the observer (a first configuration).

In the first configuration, the detector detects whether or not the observer exists around. The display panel has the transmissive rear surface, and the display device has the first display mode of turning ON the light source and displaying the color image in the display region, and the second display mode of turning OFF the light source and displaying the transmitted light image causing a background of the display panel to be seen through in the at least part of the display region. The display device is switched into the second display mode upon detection of the observer. For example, the display panel, which is exemplarily arranged a rear surface of a front panel of a showcase, a vending machine, or the like, effectively exhibits a showpiece provided in the showcase, the vending machine, or the like to the surrounding observer for higher advertising effects.

In the first configuration, the display controller may switch between the first display mode and the second display mode every fixed time, while the detector does not detect the observer (a second configuration).

The second configuration enables switching between the first display mode of displaying the color image and the second display mode of displaying the transmitted light image every fixed time, while the observer is not detected. This configuration is more likely to attract attention to a display screen in comparison to a case of displaying only the color image.

In the first configuration, color image displayed in the first display mode and the transmitted light image displayed in the second display mode may be obtained from identical image data (a third configuration).

The third configuration enables differently displaying the color image and the transmitted light image obtained from the single image data, to be more likely to attract attention of the surrounding observer to the display screen.

In any one of the first to third configurations, the color image displayed in the first display mode and the transmitted light image displayed in the second display mode may be obtained from different image data (a fourth configuration).

The fourth configuration increases variations of display contents to achieve display of the images exerting higher advertising effects, in comparison to the case of displaying the color image and the transmitted light image obtained from the identical image data.

In any one of the first to fourth configurations, optionally, the display controller displays a white image in the at least part of the display region in the first display mode, and the at least part of the display region displaying the white image and the at least part of the display region displaying the transmitted light image are equal in pixel transmissivity (a fifth configuration).

According to the fifth configuration, the region for display of the white image in the first display mode corresponds to the transmissive region causing a background of the display panel to be seen through in the second display mode. Control to turn ON and turn OFF the light source enables white display and transparent display in the at least part of the display region.

In any one of the first to fifth configurations, optionally, the light source is configured to emit light in different colors, and the display controller generates, in accordance with the image data, a plurality of subfield images displayed in subfields obtained by dividing a single frame, and switches in color of light emitted from the light source for each of the subfields upon display of the color image in the first display mode (a sixth configuration).

The sixth configuration enables display of the color image according to a field sequential system without provision of any color filter. No provision of any color filter improves transparency of the transmissive region upon display of the transmitted light image in the second display mode.

In the sixth configuration, optionally, the display controller generates a subfield image for a mixed color obtained by mixing the plurality of colors, in addition to the plurality of subfield images for the plurality of colors of light emitted from the light source, and generation of the subfield images displayed in the first display mode includes changing gradation values of the plurality of subfield images in accordance with a gradation value of the subfield image for the mixed color, and generation of the subfield images displayed in the second display mode does not include changing the gradation values of the plurality of subfield images (a seventh configuration).

The seventh configuration reduces color breakup through change of the gradation values of the subfield images for the respective colors according to the gradation value of the subfield image for the mixed color, upon display of the color image in the first display mode. The seventh configuration also improves transparency of the transmissive region causing a background to be seen through, without change of the gradation values of the subfield images for the respective colors, upon display of the transmitted light image in the second display mode.

Embodiments of the present invention will be described in detail below with reference to the drawings. Identical or corresponding portions in the drawings will be denoted by identical reference signs and will not be described repeatedly. For clearer description, the drawings to be referred to hereinafter may illustrate simplified or schematic configurations or may not illustrate some of constructional elements. The constructional elements in each of the drawings may not necessarily be illustrated in actual dimensional ratios.

First Embodiment

FIG. 1 is a pattern diagram illustrating a schematic configuration of a display device according to the present embodiment. A display device 1 is a liquid-crystal display device configured to control pixel transmissivity so as to be switched between a transmissive state causing a background to be seen through a display surface and an image display state of displaying an image to prevent the background from being seen through the display surface. The display device 1 will be described specifically below in terms of a configuration thereof.

The display device 1 includes a display controller 10, a display panel 11, a gate driver 12, a source driver 13, a drive control circuit 14, a backlight 15, a backlight control circuit 16, and a detector 20.

The display controller 10 includes a video signal input unit 10a and an image processor 10b. The video signal input unit 10a is connected to the detector 20.

The video signal input unit 10a transmits, to the image processor 10b, a video signal according to a result of detection by the detector 20. The video signal will be described in detail later.

The image processor 10b generates a control signal for image display on the display panel 11 in accordance with the video signal received from the video signal input unit 10a, and transmits the control signal to the drive control circuit 14 and the backlight control circuit 16. The image processor 10b will be described later in terms of a specific configuration thereof.

The detector 20 detects whether or not an observer of a display screen exists around the display device. The detector 20 specifically includes a distance measuring sensor or the like. The detector 20 detects, by means of the distance measuring sensor, whether or not there is any person within a predetermined distance, and regards the detected person as the observer.

The display panel 11 includes liquid crystal. The display panel 11 includes a plurality of pixels that is defined by a plurality of gate lines 110 and a plurality of source lines 111 and is arranged in a matrix form. Each of the pixels includes a thin film transistor (TFT) 113 connected to a corresponding one of the gate lines 110 and a corresponding one of the source lines 111, and a pixel electrode 114 connected to the TFT 113.

The gate lines 110 are connected to the gate driver 12 whereas the source lines 111 are connected to the source driver 13. The gate driver 12 and the source driver 13 are connected to the drive control circuit 14.

The gate driver 12 sequentially scans each of the gate lines 110 in accordance with the control signal like a timing signal or a clock signal received from the drive control circuit 14. In accordance with the timing signal and an image signal received from the drive control circuit 14, the source driver 13 applies voltage according to the image signal to each of the source lines 111. At scan timing of the corresponding gate line 110, the TFT 113 connected to the gate line 110 comes into an ON state and the voltage supplied to the corresponding source line 111 is applied to the pixel electrode 114 to control orientation of liquid crystal molecules in a corresponding one of the pixels.

The backlight 15 includes a light source 150 and a light guiding plate 151. The light source 150 includes light emitting diodes (LEDs) 15R, 15G, and 15B configured to emit light in red (R), light in green (G), and tight in blue (B), respectively. The LEDs 15R, 15G, and 15B are exemplarily positioned to face a first side surface of the light guiding plate 151. The LEDs 15R, 15G, and 15B are connected to the backlight control circuit 16.

The display panel 11 according to the present embodiment includes no color filter, and is configured to display a color image in accordance with a field sequential system in the image display state. The LEDs 15R, 15G, and 15B are sequentially turned ON for each of subfields obtained by dividing a display period for a single screen, that is, a single frame period, to display screens in different colors for display of a color image.

The light guiding plate 151 is provided adjacent to a rear surface of the display panel 11. The light guiding plate 151 is made of a transparent material. The light guiding plate 151 has a transparent portion overlapped with the display screen of the display panel 11, that is, a display area provided with the pixels. FIG. 1 shows the light source 150 positioned to face one side surface of the light guiding plate 151. The light source 150 can alternatively be positioned to face a plurality of side surfaces of the light guiding plate 151.

Figure 2A:
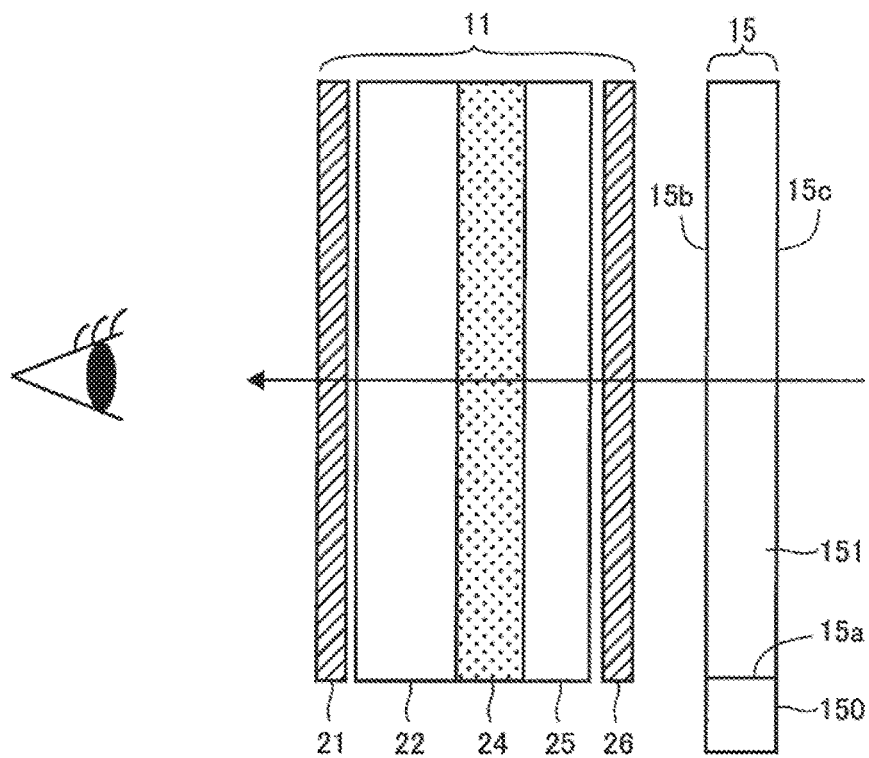
FIG. 2A is a sectional view perpendicular to a display surface of the display device illustrated in FIG. 1.
Figure 2B:
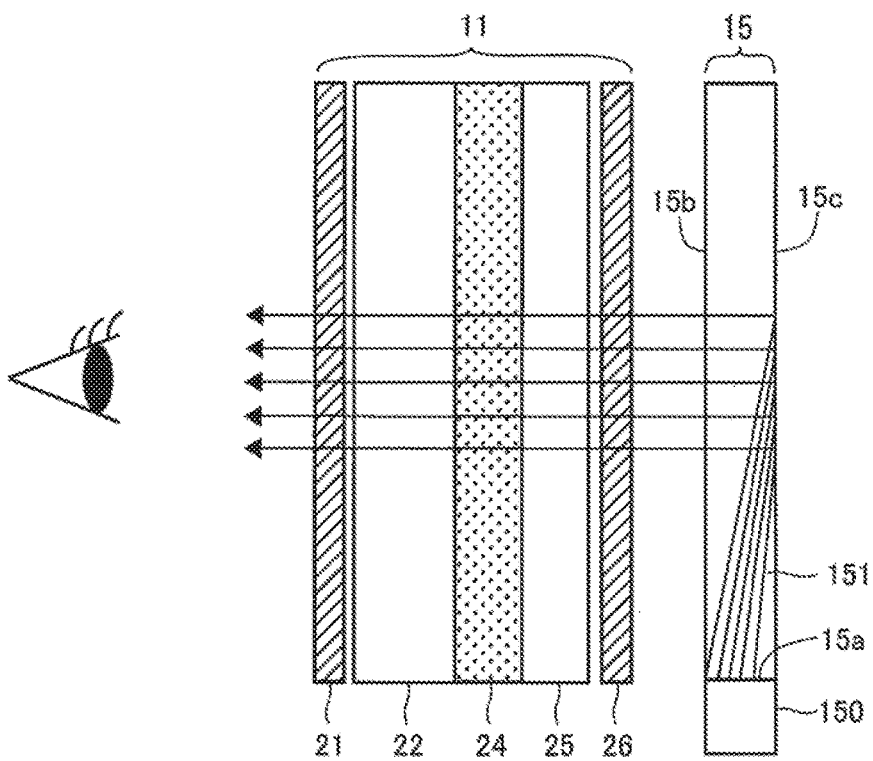
FIG. 2B is a sectional view perpendicular to the display surface of the display device illustrated in FIG. 1.

FIGS. 2A and 2B are sectional views perpendicular to the display surface of the display device 1. FIG. 2A shows an exemplary state of turning OFF the backlight 15 and displaying a transmitted light image including a transmissive region causing the rear of the display device 1 to be seen through. FIG. 2B depicts an exemplary state of turning ON the light source 150 and displaying a color image.

In the exemplary states illustrated in FIGS. 2A and 2B, the display panel 11 is positioned to be overlapped with the backlight 15 in a direction perpendicular to the display screen. The display panel 11 includes two substrates, namely, a first substrate 25 and a second substrate 22, as well as liquid crystal 24 provided between these substrates. The first substrate 25 has a first surface (e.g. the surface not adjacent to the backlight 15) provided with the gate lines 110, the source lines 111, the TFTs 113, the pixel electrodes 114, which are illustrated in FIG. 1, and the like. The first substrate 25 has a second surface provided with a polarizing plate 26. The second substrate 22 has a first surface (e.g. the surface adjacent to the backlight 15) provided with a common electrode (not depicted). The second substrate 22 has a second surface provided with a polarizing plate 21. The first substrate 25 and the second substrate 22 can be made of a transparent material such as glass or resin.

The light guiding plate 151 of the backlight 15 has an incidence surface 15a that receives light emitted from the light source 150, and an outgoing surface 15b that causes the light emitted from the light source 150 and entering the incidence surface 15a to exit from the light guiding plate 151. The display panel 11 is arranged overlapping the outgoing surface 15b of the light guiding plate 151. The backlight 15 functions as a lighting unit configured to irradiate one of surfaces of the display panel 11 with light.

As shown in FIG. 2A, the light guiding plate 151 has a rear surface 15c facing the outgoing surface 15b and having a region overlapped with the display area or the display screen for image display on the display panel 11. The region allows light to be transmitted therethrough. Specifically, the backlight 15 has a portion that is overlapped with the display screen of the display panel 11 and is configured to allow light to be transmitted therethrough. For example, the backlight 15 is provided with a member that is positioned to be overlapped with the display area of the display panel 11 in the direction perpendicular to the display screen and is made of a transparent material.

More specifically, the display panel 11 is provided, at a rear surface, with the light guiding plate 151 allowing light to be transmitted therethrough in the direction perpendicular to the display screen. The rear surface of the display panel 11 is provided with no light shielding member. The light guiding plate 151 has the rear surface that can be provided with a member made of a transparent material, such as an acrylic plate, or be provided with nothing. According to this configuration, a pixel, which corresponds to a portion of the liquid crystal 24 controlled to enable light transmission through the display panel 11, causes light travelling from behind the display device 1 and transmitted through the rear surface of the light guiding plate 151 to pass through the pixel in the display panel 11 and travel ahead of the display screen.

As shown in FIG. 2B, the light guiding plate 151 is configured to cause light, which is emitted from the light source 150 and is propagated in the light guiding plate 151, to be likely to exit from the outgoing surface 15b facing the display panel 11 and travel toward the display panel 11. The outgoing surface 15b and the rear surface 15c of the light guiding plate 151 can have dots (not illustrated) that reflect incident light and are arranged at predetermined intervals. Light emitted from the light source 150 and entering the incidence surface 15a of the light guiding plate 151 travels in the light guiding plate 151 while being totally reflected. Light emitted from the light source 150 and incident on the dots of the rear surface 15c of the light guiding plate 151 is reflected by the dots and exits from the outgoing surface 15*b* of the light guiding plate 151 to travel toward the display panel 11.

The dots can be provided by printing, or alternatively by metal mold pressing or laser processing to cause the surface of the light guiding plate 151 to be likely to reflect light. The light guiding plate 151 is not limited to have the surface shaped to reflect light, but may alternatively be made of a material that is likely to reflect light. The light guiding plate 151 can have a reflection structure for reflecting light travelling therein and causing the reflected light to exit to the outside.

When the light source 150 is turned ON, light emitted from the light source 150 and passing through the light guiding plate 151 to be applied to the display panel 11 is larger in quantity than light transmitted through the rear surface 15*c* of the light guiding plate 151 and reaching the display panel 11. In the case where the light source 150 of the backlight 15 is turned ON, the display panel 11 thus has display in a color of light emitted from the backlight 15 and prevents the rear of the display device 1, that is, a background of the light guiding plate 151, from being seen through. In another case where the light source 150 is turned OFF, the pixel (transmissive region), which corresponds to a portion of the liquid crystal 24 controlled to enable light transmission through the display panel 11, causes the rear of the display device 1 or a background of the light guiding plate 151 to be seen through the display surface.

The display device 1 is configured to be switched, in accordance with the detection result of the detector 20, into either one of a transmitted light image display mode indicating the transmissive state of causing background to be seen through the display surface and a color image display mode indicating the image display state of preventing the background from being seen through the display surface.

The display device 1 in the color image display mode turns ON the light source 150 and displays on the display panel 11 a predetermined color image including no transmissive region. To the contrary, the display device 1 in the transmitted light image display mode turns OFF the light source 150 and displays on the display panel 11 a predetermined monotonous image (transmitted light image) including a transmissive region. Specifically, the display device 1 in the transmitted light image display mode displays a white image in at least part of the region on the display panel 11 to cause the rear of the display device 1 to be seen through, and displays a black image in the remaining region.

The display panel 11 in either one of the color image display mode and the transmitted light image display mode controls transmissivity of light incident on the display panel 11 for each of the pixels in accordance with a signal received from the drive control circuit 14, to display an image.

In the color image display mode in which the backlight 15 is turned ON upon display of a color image, the display panel 11 controls transmissivity of light emitted from the light source 150, propagated in the light guiding plate 151, passing through the outgoing surface 15*b*, and incident on the display panel 11.

In the transmitted light image display mode in which the backlight 15 is turned OFF upon display of a transmitted light image, the display panel 11 controls transmissivity of light travelling from outside the display device 1, transmitted through the rear surface 15*c* of the light guiding plate 151, and incident on the display panel 11. This enables display of the transmitted light image including a transmissive region.

More specifically, exemplarily in the color image display mode, light in each of colors RGB emitted from the light source 150 is displayed in a color according to transmissivity adjusted at the display panel 11. In the transmitted light image display mode, the light source 150 is turned OFF and light transmitted through the rear surface of the light guiding plate 151 exits the display screen to travel ahead in a region of a pixel having sufficiently high transmissivity. Such a region thus serves as a transmissive region causing a background of the display device 1 to be seen through. This is enabled by, for example, providing, behind the display panel 11, the light guiding plate 151 allowing light travelling from outside the display device 1 to be transmitted through the rear surface. The transmissive region is not limited to a region of a pixel having the highest transmissivity. The transmissive region also includes a region of a pixel having transmissivity controlled to a level causing the rear to be seen through.

Exemplarily in the color image display mode, a region of a pixel having sufficiently high transmissivity of every one of the colors RGB (e.g. a pixel having the highest transmissivity) is displayed in white by light emitted from the backlight 15. In contrast, in the transmitted light image display mode, a region of a pixel having sufficiently high transmissivity serves as a transmissive region having high transparency. The display device 1 causes a region having a gradation value indicating "white" in image data to be displayed in white when the backlight is turned ON and to be displayed transparently when the backlight is turned OFF. Transparent display allows a background of the display device 1 to be visually seen through. The display device 1 thus has color display when the backlight is turned ON and has monotonous display including a region of transparent display and a region displayed in black (or a gray scale) when the backlight is turned OFF.

In a case where the detector 20 detects an observer, the display controller 10 controls the display panel 11 and the backlight 15 in the transmitted light image display mode for fixed time from timing of the detection. In another case where the detector 20 detects no observer, the display controller 10 controls the display panel 11 and the backlight 15 in the color image display mode.

In the transmitted light image display mode, the video signal input unit 10*a* in the display controller 10 transmits a video signal indicating a transmitted light image to the image processor 10*b*. In the color image display mode, the video signal input unit 10*a* transmits, to the image processor 10*b*, a video signal indicating a color image including no transmissive region.

With reference to FIG. 1 again, the backlight control circuit 16 includes backlight drive circuits (not illustrated) driving the LEDs 15R, 15G, and 15B. Each of the LEDs 15R, 15G, and 15B is turned ON in accordance with a pulse signal as a command for a turning ON period, which is received from a corresponding one of the backlight drive circuits.

The drive control circuit 14 and the backlight control circuit 16 are connected to the image processor 10*b*. The image processor 10*b* will be described below in terms of its configuration.

Figure 3:
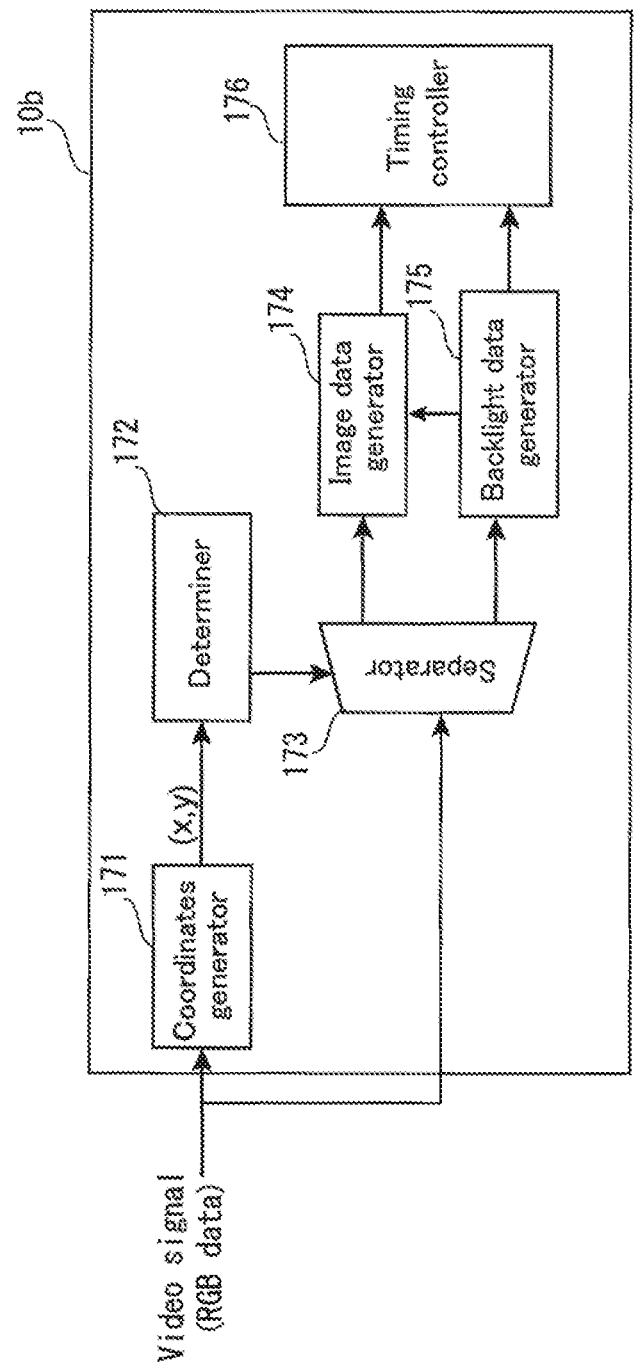
FIG. 3 is a functional block diagram illustrating an exemplary configuration of an image processor of FIG. 1.

FIG. 3 is a functional block diagram illustrating an exemplary configuration of the image processor 10*b*. As shown in FIG. 3, the image processor 10*b* includes a coordinates generator 171, a determiner 172, a separator 173, an image data generator 174, a backlight data generator 175, and a timing controller 176.

The coordinates generator 171, the determiner 172, and the separator 173 are circuits each detecting control information on the backlight 15 included in a received video signal. Described herein is detecting information for control to turn ON or turn OFF the light source 150 in every frame period. The video signal can include data for each of the pixels (e.g. respective gradation values of the colors RGB for each of the pixels). The coordinates generator 171 generates data indicating coordinates (x, y) of each of the pixels in received image data.

The coordinates generator 171 includes an externally rewritable register configured to hold the total number of horizontal pixels aligned along the gate lines 110 (see FIG. 1) of the display panel 11 and the total number of vertical lines along the source lines 111. The coordinates generator 171 increments by one a horizontal counter value upon every input of a pixel value (e.g. the gradation values of the colors RGB) included in the received video signal. When the horizontal counter value reaches M, a vertical counter value is incremented by one and the horizontal counter value is returned to zero upon subsequent input of a pixel value. The coordinates generator 171 sets coordinates (x, y) of the received pixel value assuming that a pixel at an upper left position in an image indicated by the video signal is located at an origin (0, 0), the horizontal direction is referred to as an X direction, and the vertical direction is referred to as a Y direction.

The determiner 172 specifies data applied as control information on the light source 150 out of data of the plurality of pixels included in the video signal. This exemplifies the case where the determiner 172 specifies a pixel value of predetermined specific coordinates (e.g. data of coordinates (0, 0)) in the video signal, as a value indicating control information on the light source 150 or control data of the backlight 15. Control data of the light source 150 indicates turning ON/turning OFF (not lighting) the LEDs 15R, 15G, and 15B. The determiner 172 transmits, to the separator 173 as a determination value, a value indicating whether each coordinates value corresponds to gradation values of a displayed image or control data of the backlight 15.

The video signal may include data corresponding to an image display period and data corresponding to a blanking period. In this case, data for control of turning ON/turning OFF the LEDs 15R, 15G, and 15B can be included as data corresponding to the blanking period. A single frame period is divided into an image display period and a blanking period. A pixel value for a single frame period accordingly has data corresponding to the image display period and data corresponding to the blanking period. Data corresponding to the image display period includes data like gradation values of each pixel for each of the TFTs 113. Data corresponding to the blanking period includes control data indicating whether or not to turn ON the LEDs 15R, 15G, and 15B in the frame period.

The separator 173 separates, from each pixel value in the received video signal, image data indicating an image to be displayed and control data of the backlight 15, in accordance with a result of determination by the determiner 172. The image data is transmitted to the image data generator 174 whereas the control data of the backlight 15 is transmitted to the backlight data generator 175.

The image data generator 174 generates subfield image data for display in a period for each of the subfields obtained by dividing a single frame, in accordance with the image data thus received. This exemplifies the case where the image data generator 174 generates, from the image data including the gradation values of each of the colors RGB, subfield images for colors WRGB including a mixed color W (white) as well as the colors RGB, as display data for display according to the field sequential system. The subfield images thus generated are transmitted to the timing controller 176.

The backlight data generator 175 generates LED control data for emission of light from the LED of a corresponding color in a subfield period for each of the colors WRGB, and transmits the LED control data to the timing controller 176. For example, the backlight data generator 175 and the timing controller 176 control to cause the LEDs 15R, 15G, and 15B to simultaneously emit light in the subfield period for the color W (White), cause the LED 15R to emit light in the subfield period for the color R (red), cause the LED 15G to emit light in the subfield period for the color G (green), and cause the LED 15B to emit light in the subfield period for the color B (blue).

The backlight data generator 175 generates backlight data indicating turning ON/turning OFF the LEDs 15R, 15G, and 15B in every frame in accordance with control data indicating turning ON/turning OFF the light source 150 upon display of an image indicated by a pixel value.

Specifically, in an exemplary case where the pixel value of the coordinates (0, 0) includes gradation values (R, G, B) of the colors RGB larger than thresholds, the backlight data generator 175 generates backlight data for turning ON the LEDs 15R, 15G, and 15B in a frame period for display of corresponding image data. In another case where the gradation values (R, G, B) are less than the thresholds, the backlight data generator 175 generates backlight data for turning OFF the LEDs 15R, 15G, and 15B in the frame period.

In an exemplary case where the maximum gradation value has 255, the thresholds have 128, and the pixel value of the coordinates (0, 0) includes gradation values (0, 0, 0), the backlight data generator 175 generates backlight data to command turning OFF the LEDs 15R, 15G, and 15B. In another case where the pixel value of the coordinates (0, 0) includes gradation values (255, 255, 255), the backlight data generator 175 generates backlight data to command turning ON the LEDs 15R, 15G, and 15B. The backlight data thus generated is transmitted to the image data generator 174 and the timing controller 176.

Detection of control data indicating turning ON/turning OFF the light source 150 is not limited to the above example. According to the above example, a received pixel value includes control data indicating turning ON/turning OFF. This control data may alternatively be received separately from the pixel value. The control data indicating turning ON/turning OFF may be received simultaneously with the pixel value or in correspondence with the pixel value. In this case, the image processor 10b transmits, to the backlight data generator 175 or the timing controller 176, the control data in synchronization with or in correspondence with the pixel value for the single frame period.

The timing controller 176 executes timing control for synchronization between display of the subfield images for the colors WRGB and turning ON of the LEDs 15R, 15G, and 15B. The timing controller 176 transmits, to the drive control circuit 14 (see FIG. 1) and the backlight control circuit 16 (see FIG. 1), a timing control signal for synchronization between timing of applying light in the colors RGB and light in the mixed color W and timing of displaying the subfield images for the colors WRGB.

With reference to FIG. 1 again, the drive control circuit 14 transmits, to each of the gate driver 12 and the source driver 13, a control signal such as a timing signal for driving of the display panel 11 in accordance with the subfield images for the colors WRGB and the timing control signal received from the timing controller 176.

The backlight control circuit 16 includes LED drive circuits (not illustrated) driving the LEDs 15R, 15G, and 15B. The backlight control circuit 16 switches colors of light emitted from the LEDs 15R, 15G, and 15B at timing when the drive control circuit 14 causes the subfield images for the colors WRGB to be displayed on the display panel 11. The backlight control circuit 16 causes the LED drive circuits (not illustrated) for the LEDs 15R, 15G, and 15B to control turning ON and turning OFF the LEDs 15R, 15G, and 15B in accordance with the timing control signal received from the timing controller 176.

Figure 4:
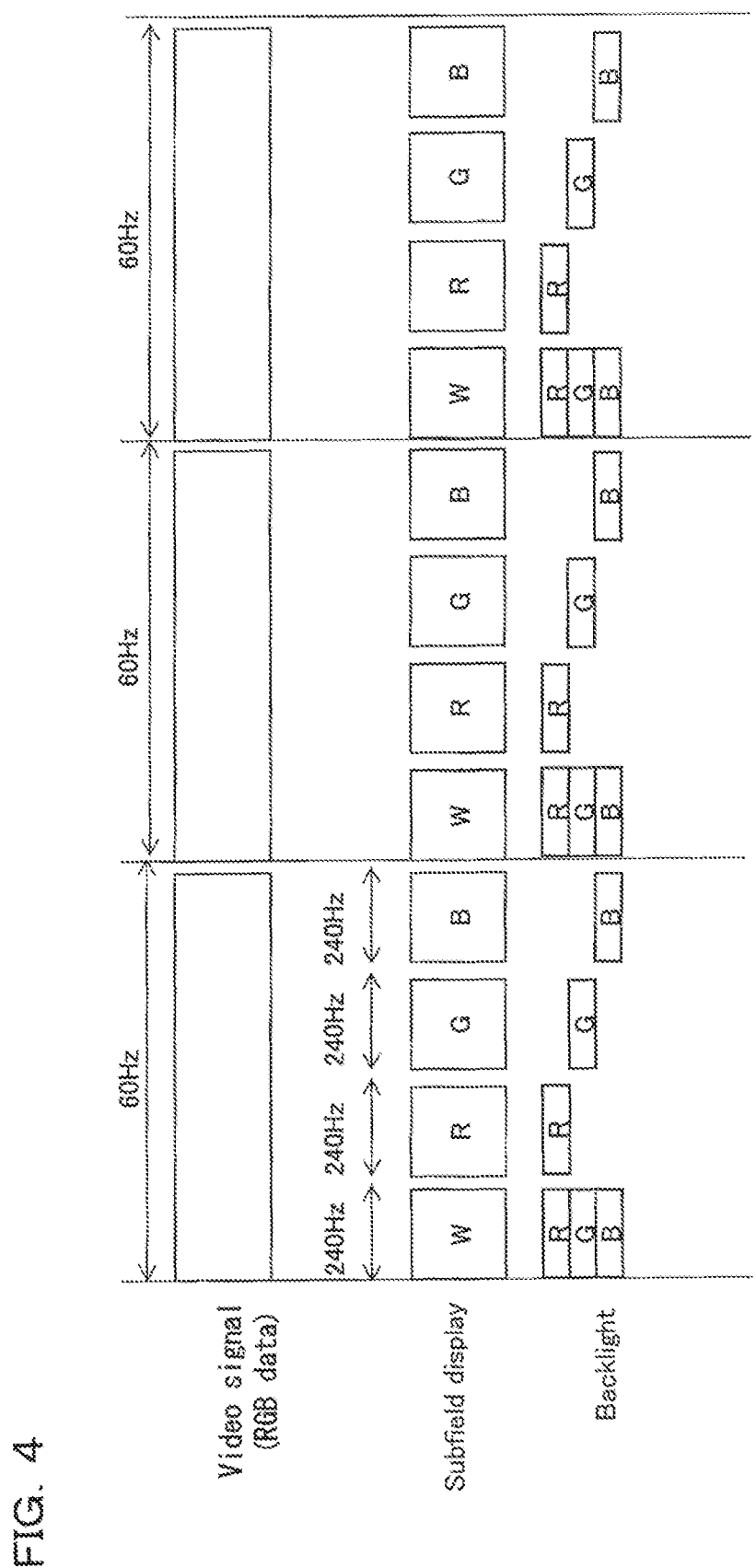
FIG. 4 is a timing chart indicating timing of displaying subfield images and turning ON a light source in a case where a video signal is inputted for every frame at 60 Hz.

Described below is timing of input of video signals upon display according to the field sequential system, display of the subfield images, and turning ON of the LEDs 15R, 15G, and 15B in the color image display mode. FIG. 4 is a timing chart of a case where a video signal is inputted for every frame at 60 Hz.

When the video signal is inputted at 60 Hz, a single frame is divided into four subfield periods (first to fourth subfield periods) for the color W, the color R, the color G, and the color B. The subfield periods each have a frequency of 240 Hz in this case.

In the first subfield period, the drive control circuit 14 causes each of the gate driver 12 and the source driver 13 to transmit to the display panel 11 a signal according to data of the subfield image for the mixed color W, and the backlight control circuit 16 causes the LEDs 15R, 15G, and 15B to simultaneously emit light. The light in the mixed color W or white is thus applied to the display panel 11. The first subfield period has display of a white (W) field in this manner. The LED 15R emits light to achieve display of a read (R) field in the second subfield period, the LED 15G emits light to achieve display of a green (G) field in the third subfield period, and the LED 15B emits light to achieve display of a blue (B) field in the fourth subfield period.

The display according to the field sequential system is executed in the color image display mode. In the transmitted light image display mode, the LEDs 15R, 15G, and 15B are kept turned OFF and the subfield images for the colors WRGB are sequentially displayed in the single frame period. In the transmitted light image display mode, each of the pixels has display of an image at transmissivity corresponding to a gradation value between the gradation value of the highest transmissivity (full transparency) and the gradation value of the lowest transmissivity (black). There is thus displayed a monochrome image (image having full transparency to black) including a transmissive region in the transmitted light image display mode. The display device 1 can display an image having a gray scale between until transparency and black in the transmitted light image display mode. The display device 1 can alternatively display a binary image including pixels having full transparency and black.

The binary image can be displayed by obtaining the binary image from image data according to a received video signal in the transmitted light image display mode in which the light source 150 is turned OFF. The binary image can be displayed alternatively through conversion by the image processor 10b of received image data to the binary image. In the latter case, the image processor 10b is configured to process image data differently between the color image display mode and the transmitted light image display mode. In this case, the image processor 10b can exemplarily include a color image generator generating image data for display of a color image according to the image data, a binary image generator generating a binary image having transparency and black in accordance with the image data, and a switcher switching between image data output from the color image generator and image data output from the binary image generator in accordance with data for control of turning ON the LEDs 15R, 15G, and 15B.

(Operation of Display Device 1)

Figure 5:
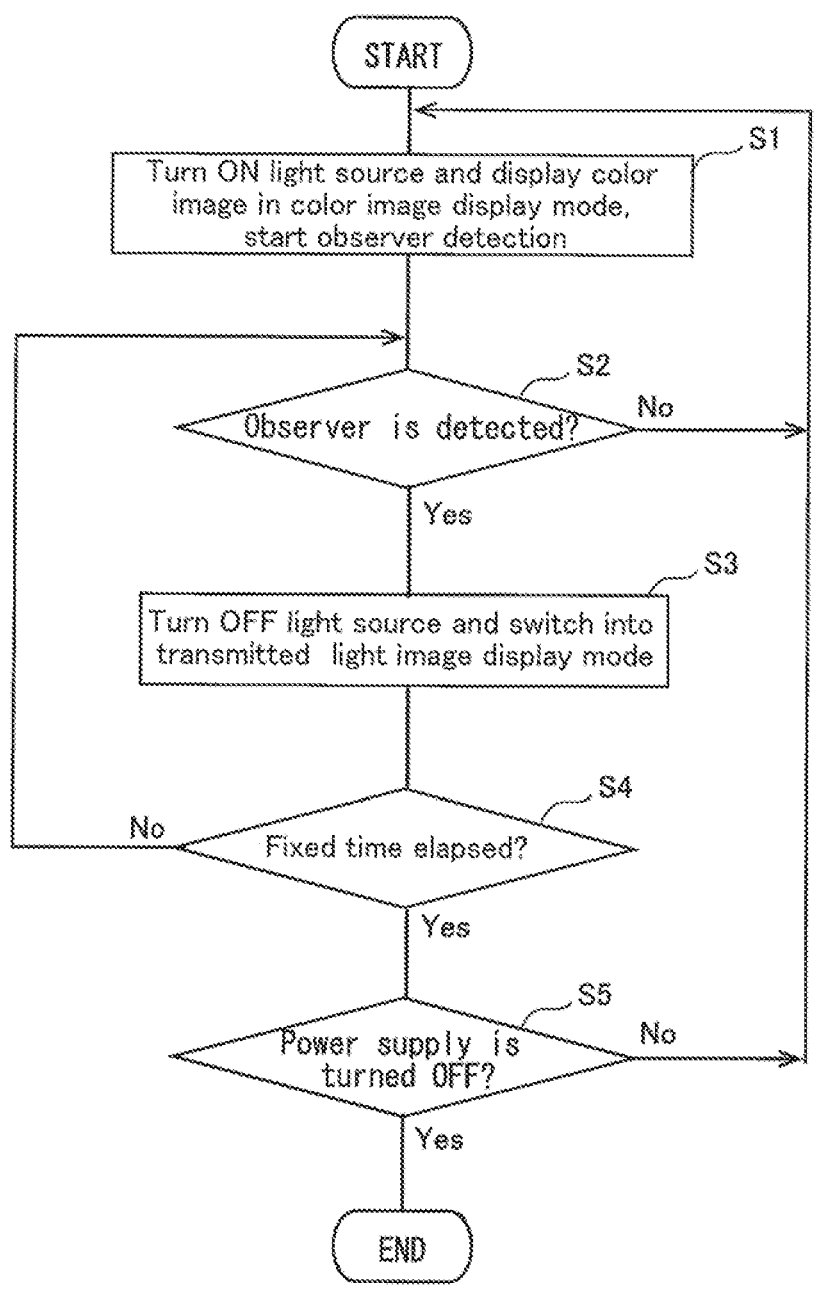
FIG. 5 is a flowchart illustrating image display processing executed by the display device according to the first embodiment.
Figure 6A:
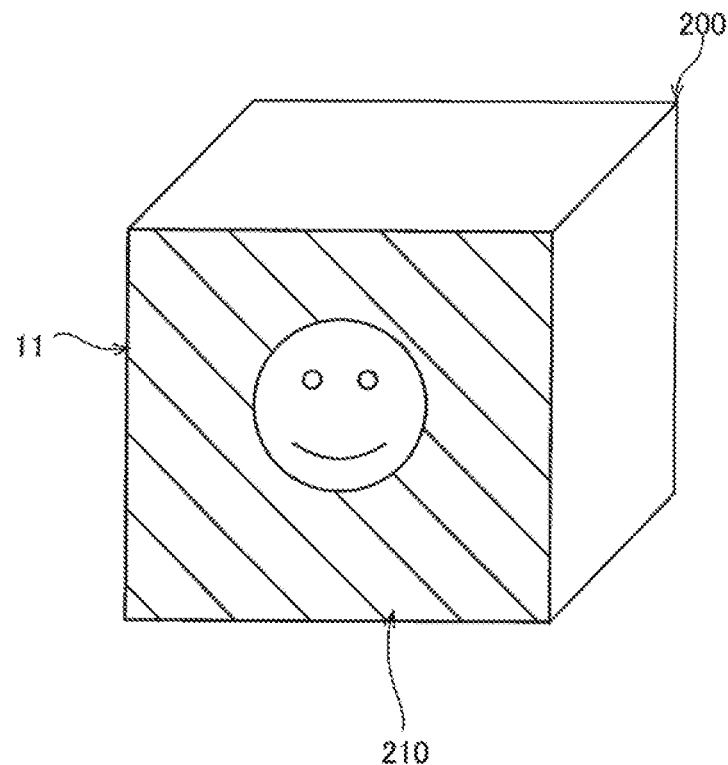
FIG. 6A is a pattern diagram illustrating exemplary use of the display device according to the first embodiment, illustrating display in a color image display mode.
Figure 6B:
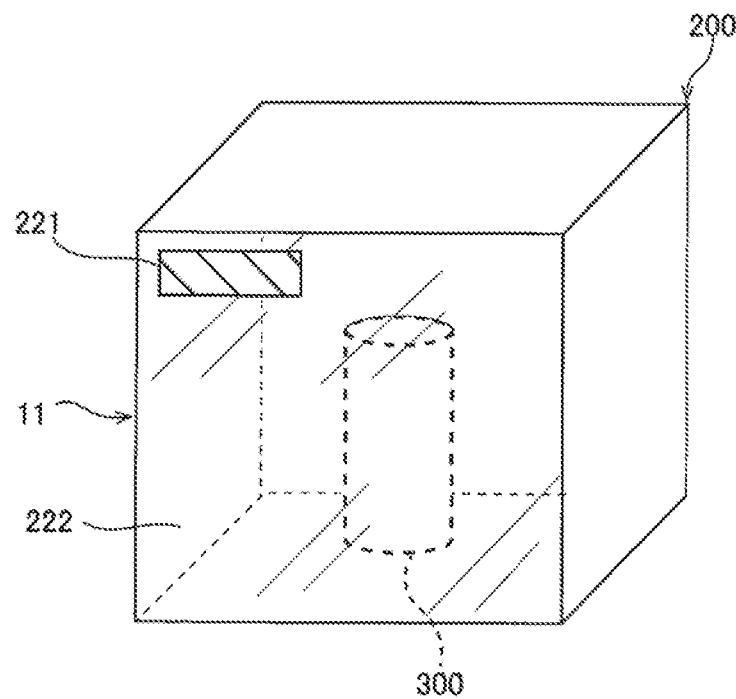
FIG. 6B is a pattern diagram illustrating exemplary use of the display device according to the first embodiment, illustrating display in a transmitted light image display mode.

FIG. 5 is a flowchart illustrating image display processing executed by the display device 1 according to the present embodiment. FIGS. 6A and 6B are pattern diagrams exemplifying use of the display device 1. Operation of the display device 1 will be described below with reference to FIGS. 5, 6A, and 6B.

As exemplarily shown in FIG. 6A, the display panel 11 of the display device 1 is provided at a rear surface of a front panel (not illustrated) of a showcase 200. FIG. 6A exemplifies a state where the display panel 11 displays a color image 210 in the color image display mode, and the inside of the showcase 200 cannot be visually recognized via the display surface in this state.

In a state where a power supply (not illustrated) is turned ON in FIG. 5, the display device 1 causes the display controller 10 to drive the display panel 11 and the light source 150 in the color image display mode. In other words, the display device 1 turns ON the light source 150 and displays the color image illustrated in FIG. 6A on the display panel 11. The detector 20 subsequently starts detecting whether or not a observer of the display screen exists(step S1). Image data as a base of the color image to be displayed in the color image display mode may be preliminarily stored in the display device 1, or may be stored in an external storage device or the like connected to the display device 1 and be acquired from the external storage device or the like by the display controller 10 upon switching into the color image display mode.

The display device 1 turns ON the light source 150 and displays the color image shown in FIG. 6A on the display panel 11 until the detector 20 detects the observer (No in step S2). When the observer is detected by the detector 20 (Yes in step S2), the display device 1 causes the display controller 10 to switch into the transmitted light image display mode, turn OFF the light source 150, and display a transmitted light image on the display panel 11 until fixed time elapses (No in step S3 and step S4).

FIG. 6B is a pattern diagram exemplifying display of the transmitted light image. As exemplarily shown in FIG. 6B, the display panel 11 includes a partial pixel region 221 displaying an image for the gradation value of the lowest transmissivity (black) and a remaining pixel region 222 displaying an image for the gradation value of the highest transmissivity (full transparency). The pixel region 222 is transparent to cause goods 300 put in the showcase 200 to be seen through the display surface. The goods 300 in the showcase 200 can thus be visually recognized by any observer surrounding the showcase 200.

The black image displayed in the pixel region 221 may include a character, a graphic, or the like relevant to the goods 300. Image data as a base of the image to be displayed in the pixel region 221 may be preliminarily stored in the display device 1, or may be stored in the external storage device or the like connected to the display device 1 and be acquired from the external storage device or the like upon switching into the transmitted light image display mode. In this case, black images are displayed in the pixel region 221 as part of the display area and transparent images are the remaining pixel region 222. Transparent images may be displayed in all the pixel regions. In the exemplary cases shown in FIGS. 6A and 6B, the pixel region displaying transparent images is particularly preferred to be provided within a range allowing the goods 300 in the showcase 200 to be observed through the display surface.

When fixed time elapses from switching into the transmitted light image display mode, the display device 1 repeats processing from step S1 until the power supply is turned OFF (Yes in step S4 and No in step S5), and ends the image display processing when the power supply is turned OFF (Yes in step S5).

The display device 1 according to the embodiment described above displays a color image until a observer of the display surface is detected, and displays a transmitted light image including a transmissive region to cause a background of the display device 1 to be seen through when any observer is detected. When the display device 1 is provided as a display on a showcase, a vending machine, or the like, goods put in the showcase, the vending machine, or the like can be exhibited effectively to the observer to achieve higher advertising effects.

Second Embodiment

The first embodiment exemplifies the case where the display panel 11 and the backlight 15 are controlled in the color image display mode while the detector 20 detects no observer. The display device may alternatively be configured to be alternately switched into the color image display mode and the transmitted light image display mode.

Specifically, in step S1 of FIG. 5 according to the first embodiment, the display device is switched between the color image display mode and the transmitted light image display mode every fixed time (predetermined frame) to alternately display the color image 210 illustrated in FIG. 6A and the transmitted light image (the image 221 and the image 222) illustrated in FIG. 6B.

Figure 7A:
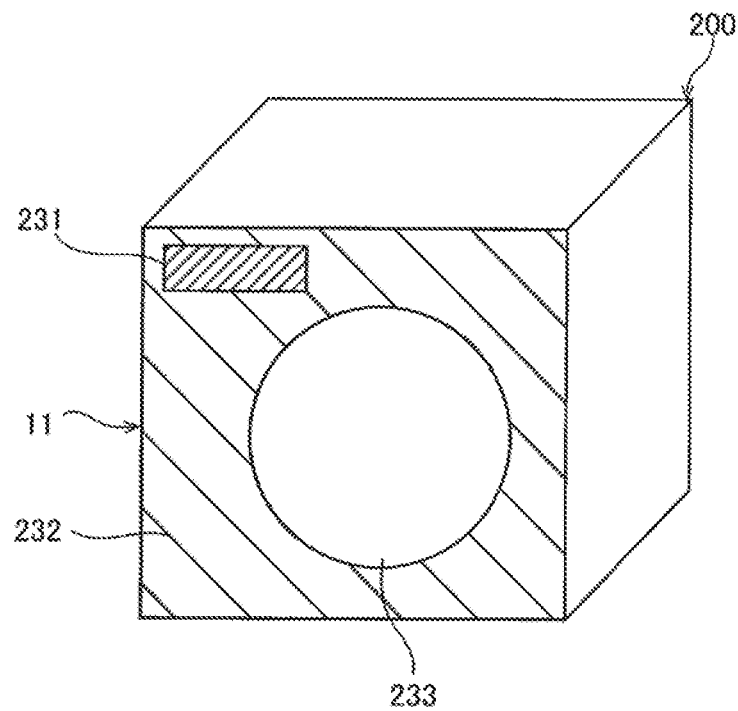
FIG. 7A is a pattern diagram illustrating display in a color image display mode according to a second embodiment.
Figure 7B:
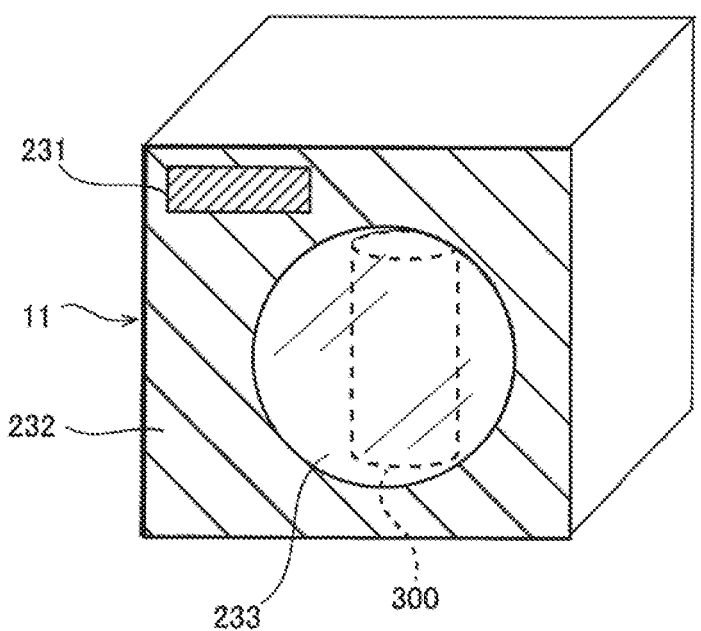
FIG. 7B is a pattern diagram illustrating display in a transmitted light image display mode according to the second embodiment.

This exemplifies display of the color image and the transmitted light image obtained from different image data in the color image display mode and the transmitted light image display mode. The display device may alternatively display a color image and a transmitted light image obtained from identical image data. FIGS. 7A and 7B shows display in the color image display mode and the transmitted light image display mode in this case, respectively.

FIG. 7A is a pattern diagram exemplifying a color image displayed in the color image display mode. FIG. 7A shows the color image: displayed on the display panel 11 and including a region 231 in red, a region 232 in blue, and a region 233 in white.

FIG. 7B is a pattern diagram exemplifying a transmitted light image displayed in the transmitted light image display mode. The transmitted light image showed in FIG. 7B has the regions 231 and 232 each having a gray scale corresponding to gradation values of the colors RGB for respective regions included in a video signal, and the region 233 having transparency. The gradation value of the white color and the gradation value of transparency each correspond to a gradation value having the highest transmissivity in all the colors RGB. The region 233 is displayed in white in the color image display mode in which the light source 150 is turned ON, and is displayed transparently in the transmitted light image display mode in which the light source 150 is turned OFF to cause the goods 300 in the showcase 200 to be seen through.

The display device is switched between the color image display mode and the transmitted light image display mode every fixed time to alternately display a color image and a transmitted light image while no observer is detected, to be more likely to attract attention of an observer surrounding the display device 1 in comparison to the case of displaying only the color image.

The display device 1 according to the present embodiment is alternately switched between the color image display mode and the transmitted light image display mode every fixed time, while no observer is detected. If the detector 20 detects any observer, the display device 1 may display in the transmitted light image display mode for a period at least longer than a period of display in the transmitted light image display mode before observer detection. This configuration increases time for exhibiting the goods in the showcase 200 to the observer to enhance advertising effects.

The display device according to an example of the present invention is described above. The display device according to the present invention should not be limited to the configuration according to any one of the embodiments described above, but can be modified in various manners.

(1) The above embodiments exemplify the case where the subfield images are generated in accordance with the same method in both of the color image display mode and the transmitted light image display mode. The subfield images may alternatively be generated in accordance with methods different from each other in the color image display mode and the transmitted light image display mode.

Figure 8:
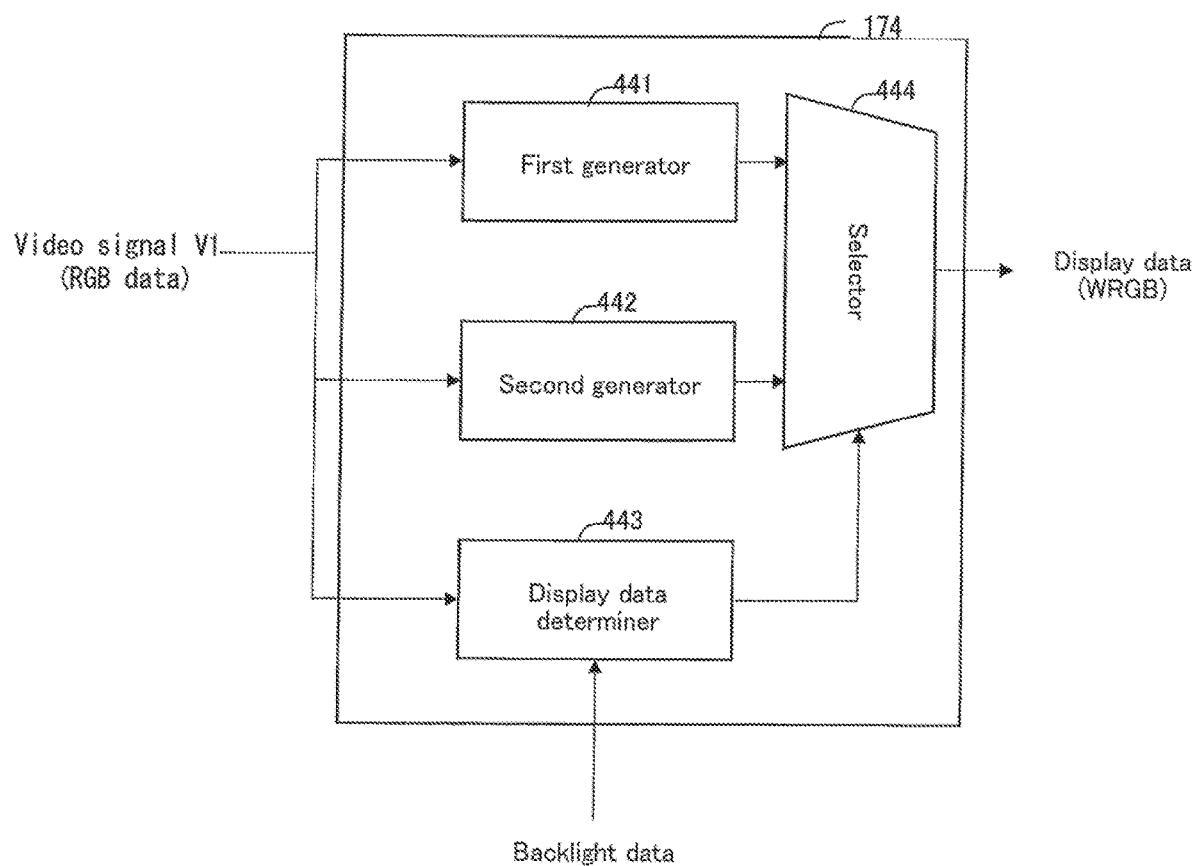
FIG. 8 is a block diagram illustrating an exemplary configuration of an image data generator according to a first modification example.

FIG. 8 is a block diagram illustrating an exemplary configuration of an image data generator 174 according to the present modification example. The image data generator 174 showed in FIG. 8 includes a first generator 441 to generate subfield images for an image displayed with the light source 150 being turned ON in the color image display mode, and a second generator 442 to generate subfield images for an image displayed with the light source 150 being turned OFF in the transmitted light image display mode. The image data generator 174 further includes a display data determiner 443 to determine output of the subfield images generated by either the first generator 441 or the second generator 442 as display data in accordance with backlight control data, and a selector 444 to select the subfield images to be outputted as the display data in accordance with the determination by the display data determiner 443.

The first generator 441 generates a subfield image for the mixed color W (white) obtained by mixing the colors RGB, in accordance with gradation values of the colors RGB included in a received video signal V1. The first generator 441 further generates subfield images for the colors RGB in accordance with the gradation values of the colors RGB included in the received video signal V1. In this case, the first generator 441 can obtain gradation values of the subfield images for the colors RGB by changing the gradation values of the colors RGB included in the video signal in accordance with the gradation value of the subfield image for the mixed color W.

The second generator 442 generates a subfield image for the mixed color W (white) obtained by mixing the colors RGB in accordance with the gradation values of the colors RGB included in the received video signal V1. The second generator 442 further generates subfield images for the colors RGB in accordance with the gradation values of the colors RGB included in the received video signal V1. In this case, the second generator 442 can regard the gradation values of the colors RGB included in the video signal as gradation values of the subfield images for these colors. In other words, the second generator 442 does not change the gradation values of the colors RGB included in the video signal V1 in accordance with the gradation value of the subfield image for the mixed color W.

The first generator 441 can specifically exemplarily determine gradation values (Wout, Rout, Gout, Bout) of the colors WRGB in display data as follows, in accordance with gradation values (Rin, Gin, Bin) of the colors RGB included in the received video signal V1. The following equation includes min(Rin, Gin, Bin) indicating a gradation value of the lowest transmissivity out of the gradation values (Rin, Gin, Bin) of the colors RGB.

Wout=min(Rin, Gin, Bin)
Rout=Rin−Wont
Gout=Gin−Wout
Bout=Bin−Wout

The first generator 441 compares the gradation values (Rin, Gin, Bin) for each of the pixels in the received video signal V1 to determine the lowest gradation value min(Rin, Gin, Bin) in the pixel as the gradation value Wout of the mixed color W. The gradation value Wout of the mixed color W can alternatively be made smaller than the gradation value min(Rin, Gin, Bin), The first generator 441 calculates gradation values of the subfield images for the colors RGB by subtracting the gradation value Wout of the mixed color W from the gradation values (Rin, Gin, Bin) of the colors RGB for each of the pixels in the video signal V1.

The second generator 442 can determine gradation values (Wout, Rout, Gout, Bout) of the colors WRGB in display data as follows, in accordance with the gradation values (Rin, Gin, Bin) of the colors RGB included in the received video signal V1.

Wout=min(Rin, Gin, Bin)
Rout=Rin
Gout=Gin
Bout=Bin

The second generator 442 determines, as the gradation value Wout of the mixed color W, the lowest gradation value min(Rin, Gin, Bin) in the gradation values (Rin, Gin, Bin) for each of the pixels in the received video signal V1. The second generator 442 determines the gradation values (Rin, Gin, Bin) of the colors RGB in the received video signal V1 as the gradation values (Wout, Rout, Gout, Bout) of the subfield images for the respective colors. That is, the gradation values (Rin, Gin, Bin) of the colors RGB are not changed in accordance with the gradation value Wout of the mixed color W.

The display data determiner 443 determines output of the subfield images generated by either the first generator 441 or the second generator 442 as display data in accordance with the video signal V1 and backlight data generated by the backlight data generator 175. The display data determiner 443 can exemplarily determine adoption of the gradation values generated by the second generator 442, of the subfield images for a pixel having gradation values of the colors RGB exceeding predetermined thresholds in an image displayed with the light source 150 being turned OFF. The display data determiner 443 determines adoption of the gradation values generated by the second generator 442 in the following exemplary case.

Rin>R_threshold, Gin>G_threshold, and Bin>B_threshold are established and the backlight is turned OFF.

Values R_threshold, G_threshold, and B_threshold indicate the predetermined thresholds for the colors RGB. The display data determiner 443 may execute the determination only in accordance with whether or not the light source 150 is turned OFF, without comparison between the gradation values (Rin, Gin, Bin) of the colors RGB and the thresholds.

The selector 444 selects whether to output the gradation values of the first generator 441 or the gradation values of the second generator 442 in accordance with the determination by the display data determiner 443. The selector 444 exemplarily selects the gradation values of the first generator 441 or the second generator 442 for each of the pixels to output the selected gradation values. The display data determiner 443 and the selector 444 are not limited to this example in terms of configurations thereof. The selector 444 can alternatively select the subfield images of either the first generator 441 or the second generator 442 for every image in a single frame period only in accordance with whether the light source 150 is turned ON or turned OFF, to output the selected subfield images.

The above configuration can reduce color breakup by insertion of the subfield for the mixed color W and change of the gradation values of the subfields for the colors RGB according to the inserted subfield for the mixed color W in the color image display mode of turning ON the light source 150 and displaying a color image. Similar change of the gradation values of the subfield images for the colors RGB may cause transparency deterioration the transmitted light image display mode for display with the light source 150 being turned OFF. In this case, transparency of the pixel having transparent display can thus be secured by not changing the gradation values of the subfields for the colors RGB in the transmitted light image display mode.

In an exemplary case where the colors RGB are each expressed by eight bits and transparent display is achieved at white (R, G, B)=(255, 255, 255), conventional insertion of the subfield image for the mixed color W leads to the gradation values "zero" of the subfield images for the colors RGB and deterioration in transparency while the light source 150 is turned OFF. Keeping gradation values "255" of the subfields for the colors RGB even upon insertion of the subfield for the mixed color W is likely to cause color breakup upon color display with the light source 150 being turned ON. In view of this, the above example includes generation of data (by the first generator 441) in the subfields for the colors WRGB in a manner prioritizing prevention of color breakup when the light source 150 is turned ON, and generation of data (by the second generator 442) in the subfields for the colors WRGB in a manner prioritizing transparency when the backlight is turned OFF.

The above example does not provide limitation in terms of generation of subfield images suitable for each of the color image display mode and the transmitted light image display mode. The first generator 441 and the second generator 442 can alternatively set the gradation value of the mixed color W to be smaller than the gradation value min(Rin, Gin, Bin). The second generator 442 can still alternatively obtain gradation values of the subfield images by differently correcting the gradation values of the colors RGB including in the received video signal V1.

According to another modification example of adopting different methods of generating subfield images in the color image display mode and the transmitted light image display mode, the color image display mode and the transmitted light image display mode can have different numbers of the subfields in a single frame period, in other words, the number of divisions of the single frame period. For example, the transmitted light image display mode can have only one or two subfields because the backlight 15 is kept turned OFF in the single frame period. The gradation values of the subfield images can be determined in accordance with the gradation values of the colors RUB in the received video signal V1 in this case.

Figure 9:
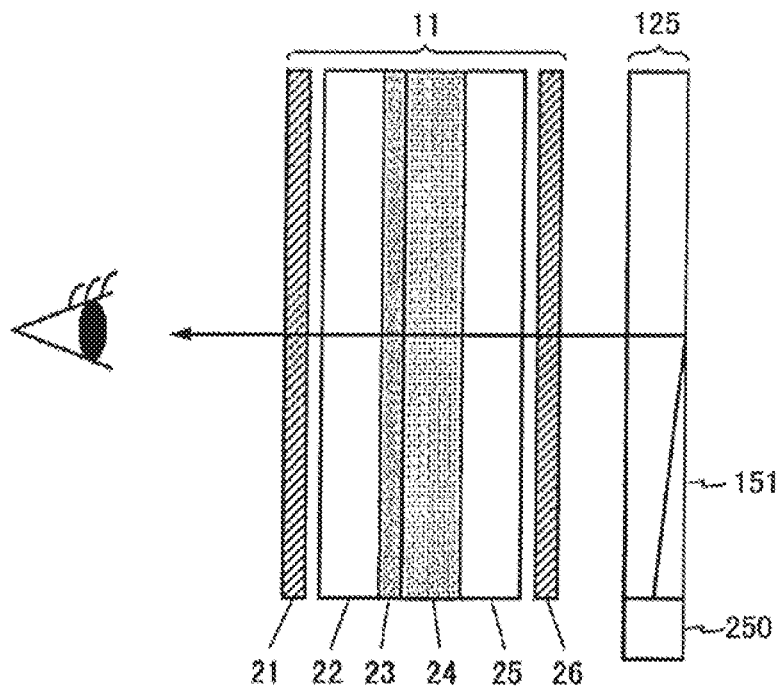
FIG. 9 is a sectional view illustrating an exemplary configuration of a color-filter display device according to a second modification example.

(2) The above embodiments exemplify the display device 1 according to the field sequential system. The present invention is also applicable to a display device including a color filter. The transmitted light image display mode can have display of a color image including a transmissive region in this case. FIG. 9 is a sectional view illustrating an exemplary configuration of a color-filter display device 1A.

FIG. 9 exemplarily shows a color filter 23 and a common electrode (not illustrated) provided on the first surface (the surface adjacent to the liquid crystal 24) of the second substrate 22. The first substrate 25 is provided with the three pixel electrodes 114 that are aligned along gate lines G1 to Gm or source lines S1 to Sn illustrated in FIG. 1 and function as a red (R) sub pixel, a green (G) sub pixel, and a blue (B) sub pixel. These three pixel electrodes 114 correspond to a single color pixel. The display panel 11 includes a number (m×n) of pixel electrodes 114 corresponding to a number (m×n/3) of color pixels. There is provided a backlight 125 including a light source 250 configured to emit white light. Examples of the light source 250 include light emitting diodes (LEDs) for the three colors RGB, and a cold-cathode fluorescent lamp (CCFL). Remaining portions of the display device 1A can be configured similarly to those according to the first embodiment.

Figure 10:
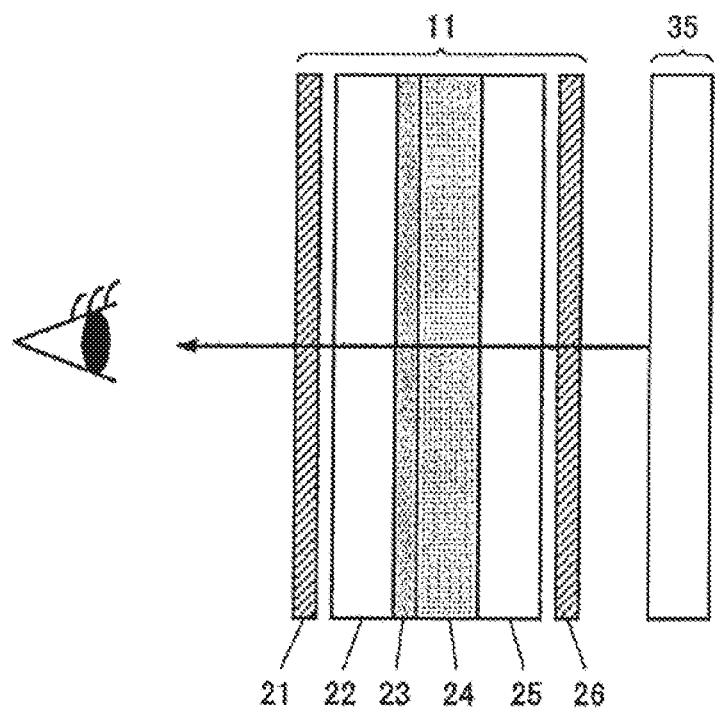
FIG. 10 is a sectional view illustrating an exemplary configuration of a display device including a direct backlight according to a third modification example.

(3) The above embodiments exemplify the backlight 15 of an edge light type, which can be replaced with a direct backlight. FIG. 10 is a sectional view illustrating an exemplary configuration of a display device including a direct backlight 35. FIG. 10 exemplifies the backlight 35 having a transparent portion overlapped with the display area of the display panel 11. The backlight 35 includes a transparent light source and a transparent substrate. The transparent light source can adopt organic electroluminescence, inorganic electroluminescence, or the like. A substantially transparent LED backlight can be obtained by disposing a large number of LEDs thin and small enough to allow light transmission for transparent display on a substrate made of glass, plastic, or the like. The transparent substrate can be a substrate itself made of a transparent material, a thin substrate (e.g. having at most several nanometers in thickness) allowing light transmission, or the like. In this manner, the display device may include the direct backlight 35 having the transparent portion overlapped with the display area of the display panel 11.

(4) The above embodiments exemplify observer detection by means of the distance measuring sensor. The present invention is not limited to this case. The display device 1 may include a camera configured to capture the periphery of the display screen, and Whether or not there is any observer of the display screen may be detected through analysis of an image captured by the camera according to a known face recognition technique.

(5) The display device according to the present invention is not limited to a liquid-crystal display device. The present invention is also applicable to a different display device (other than the liquid-crystal display device) including lighting unit to irradiate a surface of a display panel with light and having a function of causing the rear of a display screen to be seen through. The present invention is also applicable to a display device that is disposed two-dimensionally and includes a display panel provided with a plurality of shutter elements configured to control, for each pixel, an ON state of allowing light transmission and an OFF state of shielding light, and a backlight, and is configured to be switched between the ON state and the OFF state of the shutter elements a plurality of times in a single frame period in accordance with each bit in image data.

(6) The above embodiments exemplify controlling the backlight in accordance with a pixel value of the specific coordinates (0, 0) included in a video signal for a corresponding mode in both of the color image display mode and the transmitted light image display mode. Alternatively, the backlight control circuit 16 may turn OFF the LEDs 15R, 15G, and 15B without reference to the pixel value of the specific coordinates (0, 0) upon observer detection. In this case, the backlight control circuit 16 may receive the detection result of the detector 20 or receive from the display controller 10 a signal indicating whether or not the display device is in the transmitted light image display mode.

The invention claimed is:

1. A display device comprising:
a display panel having a display region including a plurality of pixels;
a lighting unit including a light source and configured to irradiate, with light emitted from the light source, a rear surface opposite to a display surface of the display panel;
a detector configured to detect whether or not an observer of the display surface exists around; and
a display controller configured to control transmissivity of the pixels in the display panel and the light source in accordance with image data to be displayed on the display panel and a result of detection by the detector; wherein
the rear surface of the display panel is transmissive, and the display controller has a first display mode of turning ON the light source and displaying a color image in the display region, and a second display mode of turning OFF the light source and displaying a transmitted light image including a transmissive region causing a background of the display panel to be seen through in at least part of the display region, and is switched into the second display mode when the detector detects the observer.

2. The display device according to claim 1, wherein the display controller switches between the first display mode and the second display mode every fixed time, while the detector does not detect the observer.

3. The display device according to claim 2, wherein the color image displayed in the first display mode and the transmitted light image displayed in the second display mode are obtained from identical image data.

4. The display device according to claim 2, wherein the color image displayed in the first display mode and the transmitted light image displayed in the second display mode are obtained from different image data.

5. The display device according to claim 1, wherein
the display controller displays a white image in the at least part of the display region in the first display mode, and
the at least part of the display region displaying the white image and the at least part of the display region displaying the transmitted light image are equal in pixel transmissivity.

6. The display device according to claim 1, wherein the light source is configured to emit light in a plurality of different colors, and the display controller generates, in accordance with the image data, a plurality of subfield images displayed in subfields obtained by dividing a single frame, and switches in color of light emitted from the light source for each of the subfields upon display of the color image in the first display mode.

7. The display device according to claim 6, wherein
the display controller generates a subfield image for a mixed color obtained by mixing the plurality of colors, in addition to the plurality of subfield images for the plurality of colors of light emitted from the light source, and generation of the subfield images displayed in the first display mode includes changing gradation values of the plurality of subfield images in accordance with a gradation value of the subfield image for the mixed color, and generation of the subfield images displayed in the second display mode does not include changing the gradation values of the plurality of subfield images.

\* \* \* \* \*